United States Patent [11] 3,608,470

[72] Inventors Vyacheslav Petrovich Zablyakin
 ulitsa Krasnokamennaya, 26b, kv. 2;
 Lev Ivanovich Abramian, pereulok
 Severny, 9, kv. 7; Alexander Pavlovich
 Anisimov, ulitsa Sergeeva, 27, kv. 2; Oleg
 Ivanovich Nikishin, pereulok Serverny, 5,
 kv. 15; Ljudmila Dmitrievna Saranova,
 Leninsky prospekt, 90, kv. 18, Kaliningrad,
 and Tatyana Konstantinovna Berends,
 Maly Kakovinsky pereulok, 6, kv. 9,
 Moscow, all of U.S.S.R.
[21] Appl. No. 873,306
[22] Filed Nov. 3, 1969
[45] Patented Sept. 28, 1971

[54] SYSTEM FOR AUTOMATIC CONTROL OF
 PROCESS OF BOILING, VACUUM COOLING AND
 DEHYDRATION OF FOOD STUFFS
 22 Claims, 5 Drawing Figs.
[52] U.S. Cl. .................................................. 99/246,
 99/330
[51] Int. Cl. ...................................................... A47d 27/00
[50] Field of Search .......................................... 99/251,
 324, 246, 330, 331, 332

[56] References Cited
 UNITED STATES PATENTS
 1,627,770 5/1927 Durkee ......................... 99/330
 2,374,425 4/1945 De Weerth .................... 99/246
 3,256,800 6/1966 Halldorsson ................... 99/246
 3,332,338 7/1967 Wein ............................. 99/330

Primary Examiner—Billy J. Wilhite
Attorney—Waters, Roditi, Schwartz & Nissen

ABSTRACT: A system for automatic control of the processes of boiling, vacuum cooling, draining a condensate and dehydration of foodstuffs, preferably meat and fish in a chamber employed for treating the foodstuffs, comprises a control unit for sending control signals during time intervals, a circuit for prescribing the program of vacuum cooling and dehydration connected to the control unit, a unit for controlling the temperature of boiling the food stuffs connected to the control unit, an actuating mechanism controlled by the control unit and connecting the chamber with the atmosphere, an actuating mechanism for draining off condensate from the chamber controlled by the control unit and an actuating mechanism for controlling the temperature connected to the temperature control unit. The system is fully automatic and utilizes further control means for accomplishing the above-said function.

SYSTEM FOR AUTOMATIC CONTROL OF PROCESS OF BOILING, VACUUM COOLING AND DEHYDRATION OF FOODSTUFFS

The present invention relates to systems for automatic control of processes, and, more particularly, to systems for automatically controlling the process of boiling, vacuum cooling and dehydration of foodstuffs, preferably meat and fish products.

Known in the art are systems for automatic control of processes, associated with boiling, cooling and dehydration of various foodstuffs, employing pneumatic and electrical components and incorporating a unit for controlling technological parameters and actuating mechanisms controlling the valve assembly of the technological apparatus.

The known systems are disadvantageous in that they fail to ensure the control of the processes with a sufficient accuracy, for example they are not suitable for controlling the process of the vacuum cooling and dehydration according to a required program, and this fact leads to ruptures of the tissues of the foodstuff being treated.

An object of the invention is to provide such a system for an automatic control of the process of boiling, vacuum cooling and dehydration of foodstuffs, which prevent the possibility of ruptures of the tissues of the food stuffs during their treatment.

According to the above and other objects, the essence of the invention consists in that the system for automatic control of the process of boiling, vacuum cooling and dehydration of foodstuffs, preferably meat and fish, comprises in combination: a control unit which produces control signals through time intervals required by the technological process; a circuit for prescribing the program of vacuum cooling and dehydration connected to the said control unit; a unit for controlling the food-boiling temperature also connected to the said control unit; an actuating mechanism controlled by the said control unit and coupling the technological apparatus, employed, for treating foodstuffs, with the atmosphere; an actuating mechanism for draining off the condensate from the technological apparatus, this actuating mechanism being controlled by the said control unit; and an actuating mechanism connected to the said temperature-control unit and used for controlling the temperature.

The system may be provided with a unit to control the process of vacuum cooling and dehydration of foodstuffs, by means of controlling the actuating mechanism, creating a vacuum in the technological apparatus, connected with the said circuit for prescribing the program of vacuum cooling and dehydration, the above-said control unit and circuit for prescribing the program of vacuum cooling and dehydration being covered by a negative feedback, the control unit being connected to an actuating mechanism for eliminating the vacuum.

The above-mentioned control unit may include a unit for selecting the operating conditions of the technological apparatus and for starting the system; a unit for controlling the said actuating mechanism, coupling the technological apparatus with the atmosphere, connected to the said unit for selection of the operating conditions and for starting the system; a unit for controlling the supply of steam and for operating the said unit, controlling the food-boiling temperature, connected to the said unit for selection of the operating conditions and for starting the system; a unit for controlling the said actuating mechanism for draining off the condensate from the technological apparatus connected to the said unit for controlling the steam supply and operated thereby, to the unit for controlling the actuating mechanism, coupling the technological apparatus with the atmosphere to set the latter to the initial condition when operating under an excessive pressure developed by the heating steam, and also connected to the said circuit for prescribing the program of vacuum cooling and dehydration in order to put the latter into operation; a unit for controlling the said mechanism eliminating the vacuum after creating thereof according to a prescribed program of cooling, connected to the said circuit for prescribing the program of vacuum cooling and dehydration; and a signalling unit to indicate the commencement and end of the process of vacuum cooling and dehydration, this unit being connected to the said unit for selection of the operating conditions and for starting the system and to the circuit for prescribing the program of vacuum cooling and dehydration.

The unit for selection of the operating conditions of the technological apparatus and for starting the system may comprise a starting element connected to the said supply unit and commutating elements connected to the said starting element.

It is desirable, that the unit for controlling the actuating mechanism, connecting the technological apparatus with the atmosphere, should accommodate the following components: a control circuit to control the excessive pressure operation, a control circuit to control the operation featuring no excessive pressure; and "OR" circuit the inputs of which are connected with the said control circuits; a control signal power amplifier connected to the said "OR" circuit.

The control circuit for the duty without an excessive pressure may comprise a memory cell for storing the signal, operating the actuating mechanism, connecting the technological apparatus with the atmosphere, connected to a corresponding commutating element of the said unit for selection of the operating continuous and for starting the system.

The control circuit for the duty with an excessive pressure may be provided with a memory cell for storing the signal, operating the actuating mechanism for connection of the technological apparatus with the atmosphere, and a device for adjusting the operating time of the actuating mechanism connected to the said memory cell for erasing the signals therein, the said memory cell being connected to a corresponding commutating element of the said unit for selection of the operating conditions and for starting the system.

The unit for controlling the steam supply may comprise the following components: a memory cell for storing a signal, connected to the said starting element and employed for switching on the said temperature control unit; a time-delay relay; a pneumoelectric transducer, connected to the said memory cell and used for switching on the said time-delay relay; an electropneumatic transducer for erasing the signal in the said memory cell, the last-mentioned transducer being connected to the memory cell and to the said time-delay relay.

The unit for controlling the actuating mechanism for draining off the condensate may comprise a memory cell for storing a signal, controlling the operation of the said actuating mechanism and connected with the said electropneumatic transducer; devices for adjusting the operating time of the said actuating mechanism and for erasing the information in the said memory cells of the considered unit and of the control circuit for the duty without an excessive pressure; a control signal power amplifier, switching on the said actuating mechanism, the output of the power amplifier being connected to the output of the memory cell of the control unit under consideration.

The unit for controlling the actuating mechanism, eliminating the vacuum, is preferably provided with the following elements: a device for adjusting the operating time of the said actuating mechanism after creating the vacuum, connected to the said circuit for prescribing the program of vacuum cooling and dehydration; a valve for feeding the said device for adjusting the operating time; a signal power amplifier, switching on the said actuating mechanism for eliminating the vacuum in the technological apparatus, connected to the said device for adjusting the operating time.

The signalling unit, indicating the commencement and end of the process of boiling, vacuum cooling and dehydration, is preferably provided with the following devices: a signalling element pneumoelectric transducers of the signal of the commencement and end of the process of boiling and cooling, connected to the said starting unit; a device for adjusting the duration of the control signal by means of the above-said signalling element, connected to the said unit for prescribing the program of cooling; a valve, feeding the said device, adjusting the control signal duration.

The circuit for prescribing the program of vacuum cooling and dehydration may be provided with the following elements: a unit for preparing the circuit to operation, a timing unit for coding the switching signals in a binary code, connected to the said preparing unit; a decoder for decoding the output signals of the timing unit; a pulse shaping unit for adjusting the time delay of the signals fed from the said decoder; a signal commutator for the said pulse-shaping unit; a starting unit, connected to the said shaping unit; a unit for prescribing the rate of setting the linear sections of the program of vacuum cooling and dehydration, connected to the said decoder and commutator; a unit for prescribing the threshold of the linear sections of the vacuum cooling and dehydration, connected to the said decoder, a unit for setting a time constant of the exponential sections of the program of vacuum cooling and dehydration, connected to the said decoder; a unit for presetting an asymptote of the exponential sections of the program of vacuum cooling and dehydration, connected to the said decoder and to the said unit for setting the time constant; an output unit for switching the components of the circuit in accordance with the output power of the output signal, connected to the said decoder, units for prescribing the rate of setting and the threshold of the linear sections and units for setting the time constant and asymptote of the exponential sections.

It is advisable that the circuit for prescribing the program of vacuum cooling and dehydration be provided with valves for transferring the "system is ready" signal and with starting member, connected with the said valves.

In the circuit for prescribing the program of vacuum cooling and dehydration the said timing unit for the decoding may comprise memory cells.

It is expedient, that the circuit for prescribing the program of vacuum cooling and dehydration be provided with an inverter for conversion of the single-shot input signal into a zero signal and vice versa, as well as with valves for passing the command signals.

The circuit for prescribing the program of vacuum cooling and dehydration is preferably made in the form of "OR" elements.

In the circuit for prescribing the program of vacuum cooling and dehydration the starting unit may comprise a memory cell for storing the starting pulse and also may comprise a pulse shaper for erasing the signal in the said memory cell.

In the circuit for prescribing the program of vacuum cooling and dehydration the unit for prescribing the rate of setting the linear sections may be provided with the following elements: a cell for prescribing the rate of setting; a constant drop cell for permanent supply of the said cell for prescribing the rate of setting and variable capacitors for accurate adjustment of the rate of setting the linear sections.

In the circuit for prescribing the program of vacuum cooling and dehydration the unit for prescribing the threshold of the linear sections may comprise a cell for presetting the necessary values of the thresholds and valves for sending a signal for shaping the linear sections.

The unit for setting the time constant of the exponential sections may comprise valves for preparing the said unit to the operation, inertia cells and valves for sending the signals for shaping the necessary exponential signal.

It is advisable, that the unit for presetting the asymptotes of the exponential sections be made in the form of a unit for presetting the necessary values of the asymptotes and in the form of signal shaping valves.

The unit for switching the circuit components in accordance with the power of the output signal may comprise the following elements: a comparison element, transferring the program of shaping from the shaping of the linear sections to the shaping of the exponential sections; a first accumulator for continuous adding of the signals, corresponding to the threshold of the linear sections and their current values; a second accumulator for adding the signals corresponding to the threshold of the linear section and to the asymptote of the exponential section; a comparison element whose input is connected to the second accumulator and the output is connected to the said timing unit; a switch connected to the said unit for prescribing the rate of setting the linear sections, to the comparison element and to the first accumulator; a power amplifier, amplifying the command signal and connected to the said switch, the above comparison elements and power amplifier being covered by a negative feedback.

The above and other objects and features of the invention will appear more fully hereinafter from a consideration of the following description taken in connection with the accompanying drawings wherein some embodiments of the invention are illustrated by way of example.

Further objects and advantages of the present invention will become more readily apparent and the invention will be between understood by reference to some embodiments thereof taken in conjunction with the appended drawings, in which.

Figure 1:
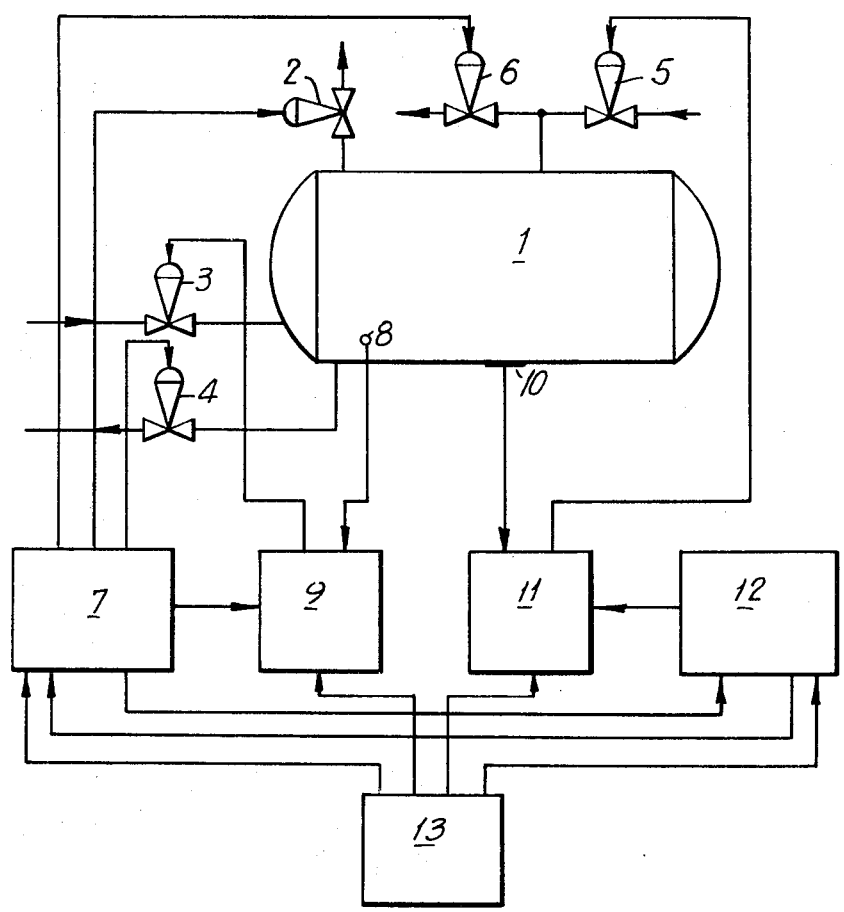
FIG. 1 shows a structural diagram of the system for automatic control of the process of boiling, vacuum cooling and dehydration, according to the invention.

An embodiment of the pneumatic system for automatic control of the process of boiling, vacuum cooling and dehydration of the tuna meat is described below.

The technological apparatus or chamber 1 (FIG. 1) for boiling and vacuum cooling of tuna meat is equipped with diaphragm actuating mechanism 2, 3, 4, 5 and 6 for communication with the atmosphere, temperature control, draining off the condensate, creating the vacuum, according to the required program of the vacuum cooling, and for eliminating the vacuum, according to the same program, respectively.

The diaphragm-actuating mechanism 2, 4 and 6 are controlled by the control unit 7 by means of sending pneumatic signals in the form of pressure of compressed air to these mechanisms.

The supply of steam into the technological apparatus 1 for boiling the tuna meat is effected by the diaphragm-actuating mechanism 3 which is controlled by a temperature-control unit, operated by the control unit 7, and comprises a temperature transmitter 8 for measuring the temperature within the technological apparatus 1, for example a gas thermometer with a pneumatic output, and a regulator 9, for example a pneumatic regulator, which is associated with a diaphragm-actuating mechanism 3.

The vacuum in the technological apparatus 1 is controlled by means of the diaphragm-actuating mechanism 5 according to a required program of cooling the tuna meat, the mechanism 5, in turn, is controlled by a vacuum-control unit comprising a pickup 10, for example a vacuum manometer with a pneumatic output, for measuring the vacuum in the technological apparatus 1, and a regulator 11, for example a pneumatic regulator, to which is connected to the diaphragm-actuating mechanism 5.

The program of vacuum cooling of the tuna meat is set by the circuit 12, prescribing the cooling program, and then is applied to the regulator 11, the circuit 12 for prescribing the cooling program being put into operation by the control unit 7. At the moment of reducing the vacuum in the technological apparatus 1 this circuit sends a control signal to the control unit 7, which forms a signal for controlling the diaphragm-actuating mechanism 6.

The power supply unit 13 is connected to e control unit 7, to the pickups 8 and 10, to the regulators 9 and 11 and to the circuit 12 for prescribing the program of cooling and supplying the above components with compressed air.

The power-supply unit comprises a power pack 14 (FIG. 2) and a unit 15 for presetting excessive pressures and is intended for cleaning the air from moisture, oil and dust and for reducing the air pressure to the values of 1.4 kg./cm.$^2$ ± 10 percent, 0.8 kg./cm.$^2$ and 0.4 kg./cm.$^2$.

The powerpack of the power supply unit consists of moisture separators 16 and 17 for dehydration of the air, a manometer 18 for indicating the pressure of the fed air, filters 19 and 20 for cleaning the air from oil and dust, pressure regulators 21 and 22 for reducing the pressure of the working air to 1.4 kg./cm.$^2$, manometers 23 and 24 for indicating the reduced pressure, two capacities 25 and 26 which serve as air receivers and are employed for supplying the system.

The unit 15 for presetting the excessive pressures consists of presetting elements 27, 28, 29 and 30 and manometers 31, 32, 33 and 34 and is intended for prescribing the values of the excessive pressure under which the working air is fed into the closed chambers of the pneumatic relays for transferring the latter to the initial condition.

The excessive pressure may be equal to 0.8 kg./cm.$^2$ and 0.4 kg./cm.$^2$.

The elements 27, 28 and 29 are intended for setting the pressure of 0.8 kg./cm.$^2$, while the element 30 is used for setting the pressure of 0.4 kg./cm.$^2$. The manometers 31, 32, 33 and 34 are designed to indicate the value of the excessive pressure.

The control unit 7 (FIG. 1) is used for automatic control of the operation of the technological apparatus by sending through definite time intervals pneumatic signals to the diaphragm-actuating mechanisms, according to a prescribed program.

The control unit is built around standard components of industrial pneumatic automation.

The control unit comprises a unit 35 (FIG. 3) for selection of the operating conditions of the technological apparatus and for starting the system, a unit 36 to control the diaphragm-actuating mechanism 2 (FIG. 1) connecting the technological apparatus 1 with the atmosphere, connected to the unit 35 for selection of the operating conditions and for starting the system, and a unit 37 for controlling the steam supply and for operating the unit, controlling the temperature of boiling the tuna meat, connected with the said unit 35 for selection of the operating conditions and starting the system. The unit 38, which controls the diaphragm-actuating mechanism for draining off the condensate from the technological apparatus, is connected with the said unit 37 for controlling the steam supply and operated thereby. The unit 38 is also connected to the unit 36, connecting the technological apparatus 1 with the atmosphere for setting it to the initial position in the duty with an excessive pressure in the technological apparatus 1, developed by the heating steam, and to the circuit 12 for prescribing the cooling program in order to put this circuit into operation. The control unit is also provided with a unit 39 (FIG. 3) for controlling the diaphragm-actuating mechanism 6 (FIG. 1) for eliminating the vacuum after creating this vacuum according to a prescribed cooling program, connected to the circuit 12 (FIG. 1) for prescribing the cooling program, and a signalling unit 40 (FIG. 3), indicating the commencement and end of the process of boiling and vacuum cooling, connected to the unit 35 for selection of the operating conditions and for starting the system and to the circuit 12 (FIG. 1).

The unit 35 (FIG. 3) for selection of the operating conditions of the technological apparatus and for starting the system incorporates a starting element in the form of a pneumatic button 41, connected to the said power-supply unit 13 (FIG. 1), and commutating elements in the form of pneumatic toggle switches 42 and 43 (FIG. 3), connected with the pneumatic button 41.

The unit 36 for controlling the diaphragm-actuating mechanism 2 (FIG. 1), connecting the technological apparatus 1 with the atmosphere, comprises a circuit 44 (FIG. 3) for controlling the apparatus in the duty without an excessive pressure, a circuit 45 for controlling the apparatus in the duty with an excessive pressure, an "OR" element 46 whose outputs are connected to the said control circuits 44 and 45, and a control signal power amplifier 47, connected to the said element 46.

The circuit 44, used for controlling the technological apparatus in the duty without an excessive pressure, comprises a memory unit for storing the signal, opening the diaphragm-actuating mechanism, which connects the technological apparatus with the atmosphere. The memory unit is based on pneumatic relay 48 and 49 and is connected with a commutating element made in the form of a pneumatic toggle switch 42, operating the circuit 44.

The circuit 45 used for controlling the technological apparatus in the duty with an excessive pressure comprises a memory cell for storing the signal which operates the diaphragm-actuating mechanism, connecting the technological apparatus with the atmosphere. The memory cell is built around pneumatic relays 50 and 51 and connected to the pneumatic toggle switch 43, operating the circuit 45.

The circuit 45 also comprises a pneumatic relay 52, a pneumatic valve 53, and a variable pneumatic throttle 54 for setting the operating time of the diaphragm-actuating mechanism.

The unit 37 for controlling the steam supply comprises the following components: a memory cell built around pneumatic relays 55, 56 and used for storing the signal, operating the temperature control unit, the said memory unit being connected to the pneumatic button 41; an electric time-delay relay 57; a pneumatic converter 58 for energizing the time-delay relay 57, connected to the pneumatic relay 55 of the memory cell, and an electropneumatic transducer 59 for erasing the signal in the memory unit, connected to the pneumatic relay 56 and to the time-delay relay 57.

The unit 38 for controlling the diaphragm-actuating mechanism 4 (FIG. 1), draining off the condensate from the technological apparatus 1, comprises a memory cell employing pneumatic relays 60 and 61 (FIG. 3) for storing the signal, controlling the operation of the diaphragm-actuating mechanism. The memory cell is connected with the electropneumatic transducer 59. The unit 38 is provided with a device built around a pneumatic relay 62, a pneumatic relay 63 and a variable pneumatic throttle 64 and used for adjusting the operating time of the diaphragm-actuating mechanism and erasing the information stored in the memory of the considered unit and the control circuit 44 in the duty without an excessive pressure, and also with a control signal power amplifier 65, operating a corresponding diaphragm-actuating mechanism and having an input connected to the output of the memory cell of the considered unit.

The unit 39 controlling the diaphragm actuating mechanism 6 (FIG. 1) for eliminating the vacuum in the technological apparatus 1 comprises a device built around a pneumatic relay 66 (FIG. 1) and a variable throttle 67 and used for adjusting the operating time of the diaphragm-actuating mechanism 6 (FIG. 1) after rising the vacuum, the above-said device being connected to the circuit 13 for prescribing the cooling program. The unit 39 also comprises a valve 68 (FIG. 3) for feeding the said device used for adjusting the operating time and a power amplifier 69, amplifying the signal, operating the diaphragm-actuating mechanism, and being connected with the pneumatic relay 66 of the above-said device.

The signalling unit 40, indicating the commencement and end of the process of boiling and vacuum cooling, comprises signalling elements 70 and 71, pneumatic transducers 72 and 73 which convert the signal of the commencement and end of the process of boiling and are connected with the pneumatic button 41, and a device, adjusting the operating time of the pneumatic transducer 73, built around a pneumatic relay 74 and a variable pneumatic throttle 75. The pneumatic relay 74 is fed through a valve 76.

Figure 4:
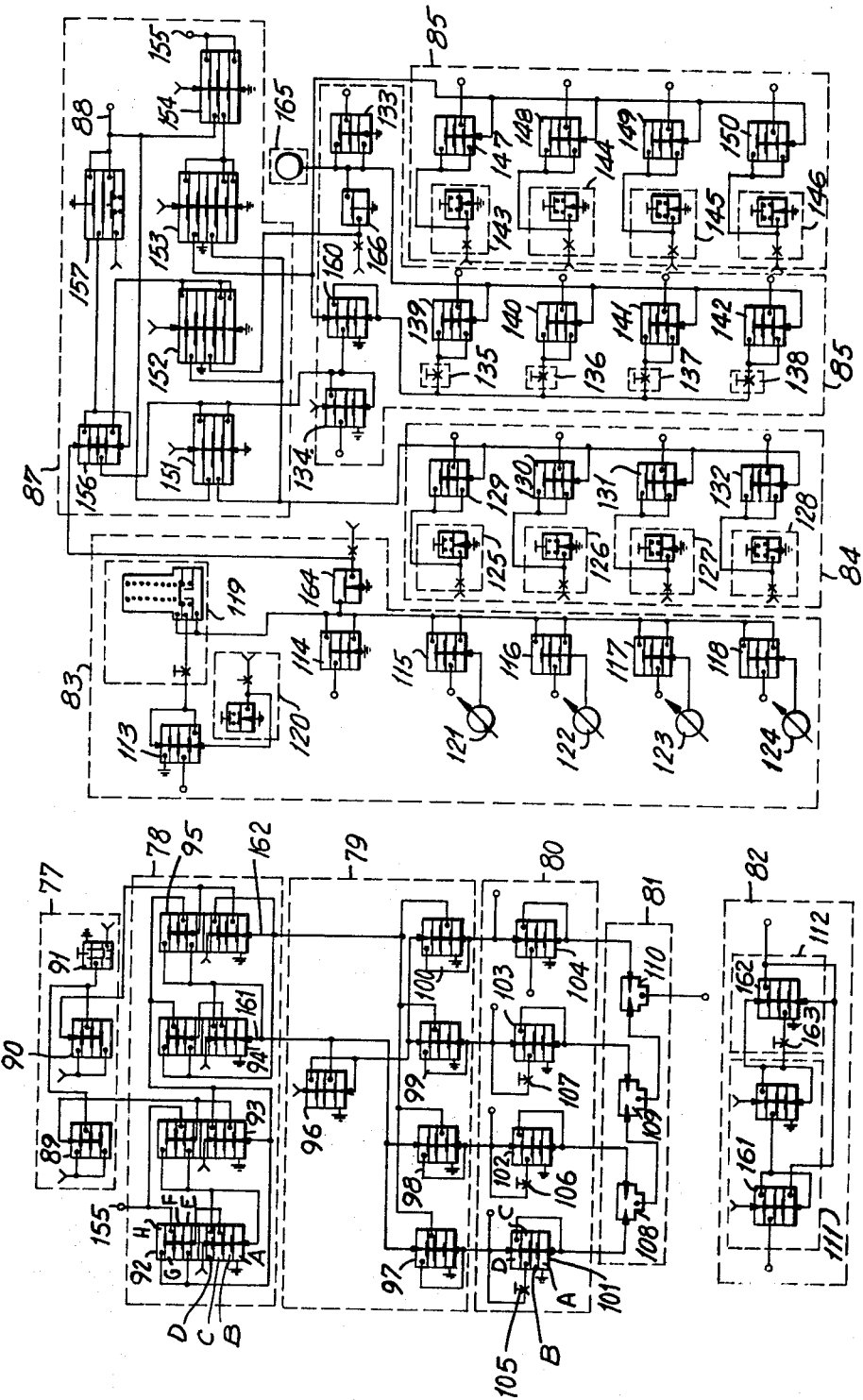
FIG. 4 is a diagram of prescribing the program of cooling, according to the invention.

The circuit for prescribing the program of vacuum cooling and dehydration comprises a timing unit 78, employed for coding the switching signals in a binary code and connected to the unit 77 (FIG. 4), preparing the circuit for the operation; a decoder 79; a unit 80; having pulse shapers for adjusting the time delay of the signals fed from the decoder 79, and a commutator 81. Connected to the shaper unit is a starting unit 82. In order to perform the program of vacuum cooling when the curve of the output signal variation has a linear and exponential sections, the circuit, prescribing the program of vacuum cooling and dehydration, is provided with a unit 83 used for prescribing the rate of setting the linear sections of the program and connected to the decoder 79 and commutator 81, a unit 84 used for prescribing the threshold of the linear sections and connected with the decoders 79, and units 85 and 86 for prescribing the time constant and asymptote of the exponential sections, respectively. The unit 85 is connected with the decoder 79, while the unit 86 is connected with the decoder 79 and with the unit 85. The switching of the components of the circuit and the power amplification are effected by the unit 87 which is connected to the decoder 79 and to the units 83, 84, 85, and 86. The output of the circuit 88, prescribing the program of vacuum cooling, is connected to the input of the regulator 11 (FIG. 1).

The preparing unit 77 (FIG. 4) comprises valves 89 and 90 for passing the preparatory signal and a starting element in the form of a pneumatic button 91 connected with the said valves 89 and 90.

The timing unit 78 comprises memory cells 92, 93, 94, and 95.

The decoder 79 is provided with an inverter 96 for conversion of the single input signal into a zero signal and vice versa, and with valves 97, 98, 99 and 100 for passing the control signals.

The unit 80 of the pulse shapers has pneumatic valves 101, 102, 103, 104 and variable throttles 105, 106 and 107.

The commutator 81 is built around "OR" elements 108, 109 and 110, whereas the starting unit 82 includes a memory cell 111 for storing the triggering pulse and a shaper 112 shaping pulses for erasing the signal in the aforesaid memory cell 111.

The unit 83, prescribing the rate of setting the linear sections, comprises valves 113, 114, 115, 116, 117 and 118 for preparing this unit for the operation, a constant-drop cell 120 for continuously feeding the above-mentioned valve 118 and variable capacitors 121, 122, 123 and 124 for accurate adjustment of the rate of setting the linear sections.

The unit 84, prescribing the threshold of the linear sections, comprises cells 125, 126, 127 and 128 for prescribing the necessary values of the thresholds and pneumatic valves 129, 130, 131, and 132 for sending a signal for shaping the linear sections.

The unit 85, presetting the time constant of the exponential sections, comprises pneumatic valves 133 and 134 for preparing the above-mentioned unit 85 for operation, inertia cells 135, 136, 137 and 138 and pneumatic valves 139, 140, 141, and 142 for sending a signal for shaping a required exponential section.

The unit 86 for presetting the asymptotes of the exponential sections is built around cells 143, 144, 145 and 146, setting the required values of the asymptotes, and pneumatic valves 147, 148, 149 and 150, shaping the signal.

The unit 87 for switching the circuit components and for power amplification of the output signal consists of the following elements: a comparison element 151, transferring the program of shaping from the shaping of the linear sections to the shaping of the exponential sections, a first accumulator 152 for continuous summation of the signals corresponding to the threshold of the linear sections and to the current values of the exponential sections, a second accumulator 153 for summation of the signals corresponding to the threshold of the linear sections and of the asymptotes of the exponential sections, a comparison element 154 whose input is connected to the second accumulator 153 and output is connected to the above-said timing unit 78, a switch 156 connected to the above-said unit 83, prescribing the rate of setting the linear sections, to the comparison element 151 and to the first summator 152, and a power amplifier 157, amplifying the control signal and connected to the said switch 156, the above-mentioned elements 151 and 154 and the power amplifier 157 being provided with a negative feedback circuit.

Below is given the time diagram of the operation of the technological apparatus in two duties.

The control unit 7 (FIG. 1) provides for operation of the technological apparatus 1 in two duties the diagram of which is given above.

In the duty with an excessive pressure in the technological apparatus at the moment of starting the 10 into 12 the control unit 7 sends signals for opening the diaphragm-actuating mechanism 2 and for operating the temperature regulator 9.

The diaphragm-actuating mechanism 2 connects the technological apparatus 1 with the atmosphere. This communication is effected in 10 to 12 minutes and time is adjusted by means of the variable throttle 54 (FIG. 3) of the circuit 45 of the unit 36, the throttle 54 providing for a wider adjustment: within 0 to 20 min. The time of boiling of the tuna meat may be prescribed within the time interval ranging from 0 to 4 hours with the aid of the time-delay relay 57 of the unit 37.

After the end of the process of boiling, the condensate is drained off from the technological apparatus with the help of the diaphragm-actuating mechanism 4. The latter is held in the "open" condition within 10 to 12 minutes by the variable throttle 64, the throttle 64 being capable of effecting a wider control of the opening time, that is, from 0 to 20 minutes.

After the drainage of the condensate and closing of the diaphragm-actuating mechanism 4 (FIG. 4) the process of vacuum cooling of the tuna meat is started in accordance with a corresponding program which makes it possible to reduce the cooling time from 12–24 hours to 25–30 minutes alongside with the provision of high quality of the product.

The duty without an excessive pressure differs from that with an excessive pressure in that the operation without an excessive pressure the technological apparatus communicates with the atmosphere during the whole time from the start of the boiling process to the start of the process of vacuum cooling.

The circuit 12 for prescribing the program of vacuum cooling shapes an output signal by the known function, the plot of which (FIG. 5) represents a compound curve consisting of a linear section 158 and exponential section 159. This function is characterized by the angle of inclination of the straight line, the threshold of its rising, the time constant of the exponent and by the value of its asymptote.

The output signal 12 (FIG. 1) is varied according to four functions, following one another. In this case the number of the functions is determined by a particular problem and may be unlimited.

When describing the operation of the system, the following designations are adopted: the chambers of the pneumatic elements are marked by the letters of the Roman alphabet, while a digit adjacent to the letter designates the number of the element on the schematic diagram. For example, chamber $B_{56}$ stands for the chamber B of the element 56. The nozzles of the pneumatic relays are marked by the letter C of the Roman alphabet. The digit "2" adjacent to the letter C designates the upper nozzle of the relay, the digit "1" denotes the lower nozzle. The second digit adjacent to the letter C denotes the number of the relay on the schematic diagram, for example: $C_{2-60}$ denotes the upper nozzle of the relay 60.

It will be noted, that the discrete signal "1" represents a pulse of compressed air under a pressure of 1.4 kg./cm.$^2$, while the signal "0" corresponds to the atmospheric pressure.

The system operates as follows.

After supplying the compressed air through the reducers 21 and 22 (FIG. 2), the pressure of 1.4 kg./cm.$^2$ is set by employing the manometers 23 and 24. By means of the elements 27, 28 and 29 for prescribing the excessive pressures and with the aid of the manometers 31, 32 and 33, a pressure of 0.8 kg./cm.$^2$ is set, whereas the element 30 is used for setting a pressure 0.4 kg./cm.$^2$ checked by the manometer 34.

Let us consider the operation of the technological apparatus 1 (FIG. 1) in the duty without an excessive pressure.

For the provision of this duty the pneumatic toggle switches 42 and 43 (FIG. 3) are set to the position in which the chamber $A_{48}$ is connected with the output of the pneumatic button 41, while the chamber $A_{50}$ is switched off from this button. Thus, the memory cell of the circuit 44 is switched on to control the diaphragm-actuating mechanism, communicating the technological apparatus with the atmosphere in the duty without an excessive pressure.

In the initial position (after supplying the compressed air and providing the excessive pressures) the nozzles $C_{2-48}$ and $C_{1-49}$ are closed, while the nozzles $C_{1-48}$ and $C_{2-49}$ are open.

As a result, the air fed into the nozzle $C_{2-49}$ does not pass through the nozzle $C_{2-48}$ to the output of the pneumatic relay 48, the output signal of the circuit 44 thus being equal to "0."

By pressing the pneumatic button 41, the signal "1" through the pneumatic toggle switch 42 is applied into the chamber $A_{48}$ and then through the nozzle $C_{1-48}$ into the chamber $C_{48}$.

When the pressure in the chamber $C_{48}$ is equal to or exceeds the excessive pressure in the chamber $B_{48}$, the nozzle $C_{1-48}$ is closed, the nozzle $C_{2-48}$ is opened, the air from the output of the pneumatic relay 49 being supplied therethrough into the chamber $C_{48}$, and the signal "1" appears at the output of the pneumatic relay 48, which signal remains after switching off the pulse from the pneumatic button 41. Through the "OR" element 46 this signal is fed to the input of the amplifier 47 and amplified thereby. From the output of the amplifier the signal is applied to the diaphragm-actuating mechanism 2 (FIG. 1), opening it.

Thus, the technological apparatus is connected with the atmosphere.

The signal "1" from the pneumatic button 41 (FIG. 3) is simultaneously fed to the input of the pneumatic relay 55 of the memory cell of the control unit 37 and to the technological apparatus. After storing the signal in the considered cell a signal "1" appears at the output of the pneumatic relay 55, which signal switches on the temperature pneumatic regulator 9 (FIG. 1). At the same time, the signal "1" is applied to the pneumoelectric transducer 58 the normally open contacts of which are closed and switch on the time-delay relay 57, prescribing the time of boiling. When the predetermined time of boiling is over, the contact of the time-delay relay switches on the circuit of the coil of the pneumatic transducer 59, at the output of which appears the signal "1" fed into the chamber $B_{56}$.

The nozzle $C_{2-56}$ is closed, cutting off the supply of air, while the nozzle $C_{1-56}$ is opened through which the air from the chamber $C_{55}$ through the nozzle $C_{2-55}$ is discharged into the atmosphere. The memory cell of the unit 37 is set to the initial position, the stored signal is erased, and the signal "1" appears at the output of the unit, which signal remains after the disappearance of the signal "1" from the output of the electropneumatic transducer 59.

During the operation of the unit 37 the temperature is controlled in the following manner.

A pneumatic signal, varying proportionally to the change of temperature in the technological apparatus, is applied to the regulator 9 from the temperature pickup 8.

In the regulator 9 this signal is compared with the signal corresponding to the predetermined temperature of boiling of the tuna meat, and a pneumatic signal is shaped which controls the diaphragm-actuating mechanism 3 effecting the supply of steam into the technological apparatus.

Figures 2, 3:
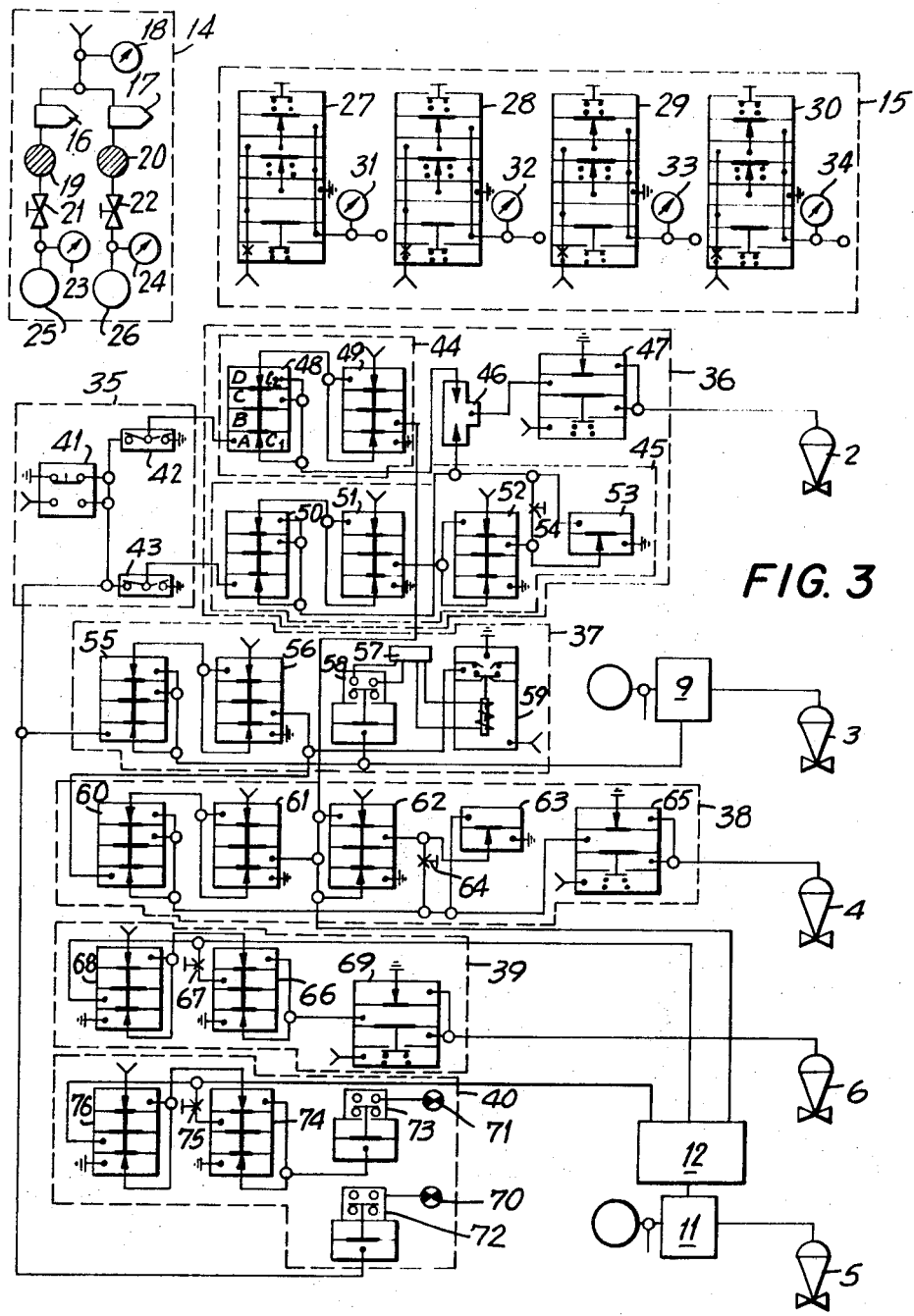
FIG. 2 shows a schematic diagram of the power-supply unit of the system according to the invention.
FIG. 3 shows a schematic diagram of the control unit, according to the invention.

The signal "1" from the electropneumatic transducer 59 (FIG. 3) is simultaneously applied into the chamber $B_{56}$ and into the chamber $A_{60}$ of the memory cell of the unit 38. The memory cell stores the signal "1" and applied it to the amplifier 65 which amplifies this signal. From the output of the amplifier 65 the signal is fed to the diaphragm-actuating mechanism 4 (FIG. 1) for draining off the condensate from the technological apparatus. The adjustment of the duration of the control signal is effected by an adjusting device comprising the pneumatic relay 62 (FIG. 3) and the variable throttle 64 (FIG. 3).

The signal "1" from the output of the pneumatic relay 60 is fed to the input of the variable throttle 64. Depending upon the cross section of its controllable orifice, the rate of filling the chamber $C_{62}$ is varied, and, therefore, the memory time of the signal "1" in the memory cell of the unit 38 is also varied.

When the pressure in the chamber $C_{62}$ becomes equal to or higher than the excessive pressure in the chamber $B_{62}$, the nozzle $C_{1-62}$ closes, while the nozzle $C_{2-62}$ opens and the chamber $_{61}$ and $B_{49}$ will be fed with air. As a result, the memory cells of the units 36 and 38 will be reset to the initial state, and the signal "0" will appear at the outputs thereof. The diaphragm-actuating mechanisms will be closed, thus preparing the technological apparatus to the process of vacuum cooling.

After erasing the signals in the memory cell of the unit 38 (FIG. 3) the nozzle of the pneumatic valve 63 is open, through which the pressure from the chamber $C_{62}$ is released into the atmosphere. The unit 38 is set to the initial position.

At the same time, the signal "1" from the output of the pneumatic relay 62 is fed to the circuit 12 (FIG. 1) for prescribing the program of vacuum cooling, putting this circuit into operation.

Figure 5:
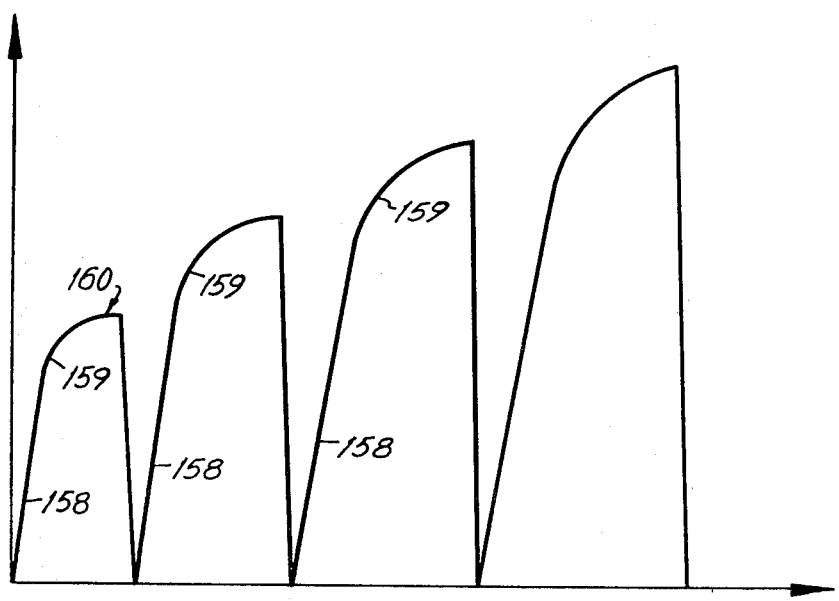
FIG. 5 is a flow diagram of the program of cooling tuna meat after the heat treatment.

As seen from FIG. 5, after creating the vacuum in the technological apparatus, it is eliminated by the diaphragm-actuating mechanism 6 (FIG. 1) controlled by the unit 39 (FIG. 3).

In the initial condition of the unit 39 the nozzles $C_{1-68}$ and $C_{2-66}$ are closed, while the nozzles $C_{2-68}$ and $C_{1-66}$ are open. At the output of the valve 68 there is the signal "1," shaped by the feed supplied through the nozzle $C_{2-68}$ to the input of the valve 68. As the nozzle $C_{2-66}$, connected with the output of the pneumatic valve 68, is closed, the signal "0" appears at the output of the pneumatic relay 66 and, therefore, there is not any control signal at the output of the amplifier 69. The diaphragm-actuating mechanism 6 (FIG. 1) is closed.

At the instant the program of vacuum is formed by the circuit 12, the signal "1," fed from the circuit 12, is applied into the chamber $B_{68}$ and to the input of the variable throttle 67 of the unit 39 of the control unit (FIG. 3), and under the action of this signal the nozzle $C_{2-68}$ is closed and the nozzle $C_{1-68}$ is opened. The signal "0" is shaped at the output of the pneumatic relay 68. The chamber $C_{66}$ through the variable throttle 67 is filled at a rate predetermined by the throttle 67.

When the pressure in the chamber $C_{66}$ becomes equal to or higher than the excessive pressure in the chamber $B_{66}$, the nozzle $C_{1-66}$ closes and the nozzle $C_{2-66}$ opens. At the moment when the signal "1" disappears from the circuit 12 (FIG. 1) under the action of the excessive pressure in the chamber $C_{68}$ (FIG. 3) the signal "1" appears at the output of the pneumatic relay 66 which is fed through the nozzle $C_{2-66}$ to the input of the amplifier 69. This signal exists until the compressed air is discharged from the chamber $C_{66}$ through the variable throttle 67. Then the nozzle $C_{2-66}$ is closed, while the nozzle $C_{1-66}$ is open, and the signal "1," existing at the output of the pneumatic relay 66, is fed into the atmosphere. The unit 39 is reset to the initial condition. The signal "1" from the amplifier 69 is fed to the diaphragm-actuating mechanism 6 (FIG. 1), opening it. The vacuum in the technological apparatus is filled with air from the atmosphere.

When the starting the system into operation, the signal "1" from pneumatic button 41 (FIG. 3) is fed to the pneumoelectric transducer 71 of the unit 40, the normally open contact of which is closed, switching on the signalling element 70 which indicates the commencement of the process of boiling and vacuum cooling of the tuna meat.

The pneumatic valve 76, relay 74, and variable throttle 75 are commutated similarly to the corresponding elements of the unit 39. After the process of vacuum cooling is over, the signal "1" is fed from the circuit 12 (FIG. 1) to the chamber $B_{76}$ (FIG. 3) and to the input of the variable throttle 75 of the unit 40, putting the latter into operation. The signal "1" from the output of the pneumatic relay 74 is applied to the pneumatic transducer 73 whose normally open contact switches on the signalling element 72 which indicates the end of the boiling and vacuum cooling of the tuna meat.

The operation of the circuit for prescribing the program of vacuum cooling of the tuna meat (FIG. 4) is considered by way of example of shaping the output signal according to the first function 160 (FIG. 5).

On pressing the pneumatic button 21 (FIG. 3), the chambers $C_{89}$ and $C_{90}$ are fed with a signal "1," under the action of which the nozzles $C_{2-89}$ and $C_{2-90}$ are forced open.

As a result, the signal "1" appears at the output of the pneumatic valves 89 and 90 of the unit 77 which is fed into the chambers $B_{93}$, $E_{93}$, $B_{95}$ and $E_{95}$ of the memory cells 93 and 95 of the timing unit 78. Under the action of this signal, the nozzles $C_{2-93}$, $C_{2-95}$ are closed and the nozzles $C_{3-93}$ and $C_{3-95}$ are opened.

Compressed air is discharged from the memory cells 92, 93, 94 and 95 into the atmosphere through the nozzles $C_{3-93}$, $C_{3-95}$ and through the chambers $A_{93}$ and $A_{95}$.

The signals "0" appear at the outputs 161 and 162. The signal "0" from the output 161 is fed into the chamber $B_{96}$ and to the nozzles $C_{2-97}$ and $C_{2-98}$ of the valves 97 and 98, while the signal "0" from the output 162 is fed into the chambers $C_{97}$, $B_{98}$, $C_{99}$, $B_{100}$.

The inverter 96 and the valves 97, 98, 99 and 100 of the unit 79 are connected in such a manner that in the considered case the signal "1" appears only at the output of the pneumatic valve 100, whereas the signal "0" is shaped at the outputs of the pneumatic valves 97, 98 and 99. The signal "1" from the output of the pneumatic valve 100 is applied to the nozzle $C_{2-104}$ and into the chambers $B_{115}$, $B_{129}$, $B_{139}$, $B_{147}$. Under the action of this signal, the nozzles $C_{2-115}$, $C_{2-129}$, $C_{2-139}$ and $C_{2-147}$ are forced open.

As a consequence, the compressed air from the pneumatic capacitance through the nozzles $C_{2-115}$ and $C_{2-114}$ is discharged into the atmosphere, i.e. the cell 119 of the unit 83 for prescribing the rate of setting the linear reaction, is prepared for the operation; the prescribing of the threshold of the linear section is applied to the chambers $B_{151}$, $E_{152}$ and $C_{153}$, while the prescribing of the asymptote of the exponent is applied to the nozzle $C_{2-100}$ and into the chamber $E_{153}$.

The signals in the chambers $E_{153}$ and $C_{153}$ are summed up and from the output of the summator 153 are fed into the chamber $B_{154}$ of the comparison element 154, the signal "0" appearing at the output thereof, as under the action of the input signal the nozzle $C_{2-154}$ is closed and the nozzle $C_{1-154}$ is opened.

When applying the signal "1" from the output of the pneumatic relay 62 (FIG. 3) of the unit 38 of the control unit into the chamber $C_{161}$ (FIG. 4) of the unit 82 of the circuit for prescribing the program of vacuum cooling and dehydration, the signal "1" appears at the output of the pneumatic relay 162 of the unit 82, the duration of the signal being adjusted by the variable throttle 163. This signal is applied into the chamber $C_{104}$. The signal "1" is formed at the output of the pneumatic relay 104, which is fed through the "OR" element 110 of the commutator 81 into the chambers $B_{113}$, $C_{114}$, $C_{134}$, $B_{133}$. The nozzles $C_{1-133}$, $C_{2-114}$, $C_{2-134}$ and $C_{2-133}$, connected with the atmosphere, are closed.

The unit 83 for prescribing the rate of setting the linear section starts to shape a corresponding signal, amplified by the follower 164 and fed through the nozzle $C_{2-56}$ to the amplifier 157 whose output is connected with the chambers $C_{151}$ and $C_{154}$. If the signals in the chambers $C_{151}$ and $B_{151}$ are equal, a signal "1" appears at the output of the comparison element 151 which is fed into the chamber $B_{156}$ of the switch 156 and through the valve 134 into the chamber $C_{160}$. As a result, the pneumatic relay 156 is switched over, closing the nozzle $C_{2-150}$, passing the signal from the unit 83 for prescribing the rate of setting the linear section, and opening the nozzle $C_{1-156}$, through which is fed the signal from the unit 85 for presetting the time constant of the exponent. The pneumatic relay 160 is opened for passing the signal from the unit 85, presetting the asymptote of the exponent, to the unit 85 for presetting the time constant of the exponent, which, just as an electrical RC-circuit, forms an inertia link:

$$T(dp/dt) + p = p_1,$$

where $T = c/\alpha R\theta$ is the time constant of the inertia link, $\alpha$ is the conductance of the variable pneumatic throttle 163

$C$ is the volume of the capacitance 165, $R$ and $Q$ are gas constant and absolute air temperatures respectively, $p_1$ is the input pressure, $P$ is the output pressure.

The signal from the unit 85, amplified by the follower 166, is fed into the chamber $C_{152}$ and added up to the prescribing of the threshold of the linear section.

The signal from the output of the accumulator 152 through the pneumatic relay 156 and amplifier 157 is applied to the regulator 11 (FIG. 1) for adjusting the vacuum.

If the pressure in the chamber $C_{154}$ becomes equal to or higher than the sum of pressures of the threshold of the linear section and of the asymptote of the exponent, in the chamber $B_{154}$, a pulse "1" is produced at the output of the comparison element 154, which is fed into the chambers $G_{92}$ and $F_{93}$ of the memory cells 92 and 93, switching the unit 78 over for forming the output pressure according to the next function.

The vacuum is adjusted in the following manner.

The signals from the circuit 12 and from the vacuum pickup 10 (FIG. 1) are fed to the regulator 11. The regulator 11 compares these signals, produces a control signal and sends it to the diaphragm-actuating mechanism 5, controlling it so as to provide a vacuum in the technological apparatus under the necessary program.

The temperature and the vacuum in the technological apparatus may be recorded by any appropriate instrument.

The prescribing circuit may be employed in any branch of industry for controlling not only the vacuum but also the pressure, temperature, consumption and any other physical parameter, varying in accordance with the plot shown in FIG. 5.

It is to be understood that the form of the invention described herein and shown in the appended drawings is to be taken as a preferred example of the same, and that various changes and modifications of the invention may be made without departing from the scope of the invention.

These changes and modifications are considered within the spirit and scope of the present invention which are the subject of the foregoing claims.

1. A system for automatic control of the process of boiling, vacuum cooling, draining a condensate and dehydration of foodstuffs, preferably meat and fish in a chamber employed for treating the foodstuffs, comprising in combination: a control unit for sending control signals through time intervals, a circuit for prescribing the program of vacuum cooling and dehydration connected to said control unit, a unit for controlling the temperature of boiling the foodstuffs connected to said control unit, an actuating mechanism controlled by said control unit and connecting the chamber with the atmosphere, an actuating mechanism for draining off condensate from the chamber controlled by said control unit, and an actuating mechanism for controlling the temperature connected to said temperature control unit.

2. A system as claimed in claim 1 comprising a unit for controlling the process of vacuum cooling and dehydration of foodstuffs by driving the actuating mechanism and producing a vacuum in the chamber connected to said circuit for prescribing the program of vacuum cooling and dehydration, said control unit and said circuit for prescribing the program of vacuum cooling and dehydration including a feedback means, the control unit being connected to the actuating mechanism for eliminating the vacuum.

3. A system as claimed in claim 1 wherein said control unit comprises a unit for selection of the operating conditions of the chamber and for starting the system connected to and controlling the actuating mechanism connecting the chamber with the atmosphere, a unit for regulation of the steam supply for putting into operation said unit controlling the temperature of boiling the foodstuffs connected with said unit for selection of the operating conditions and for starting the system; a unit to control said actuating mechanism for draining off the condensate from the chamber connected to said unit for controlling the steam supply and operated thereby and to the unit for controlling the actuating mechanism connecting the chamber with the atmosphere and setting the latter to the initial condition in the duty with an excessive pressure in the chamber built up by the heating steam, and connected to said circuit for prescribing the program of vacuum cooling and dehydration to put the latter circuit into operation; a unit for controlling said mechanism eliminating the vacuum after creating a vacuum according to a predetermined cooling program, said unit for controlling said mechanism being connected to said circuit for prescribing the program of vacuum cooling and dehydration; a unit indicating the commencement and end of the process of boiling, vacuum cooling and dehydration connected to said unit for selection of the operating conditions and for starting the system and to said circuit for prescribing the program of vacuum cooling and dehydration.

4. A system as claimed in claim 3 wherein said unit for selection of the operating conditions of the technological apparatus and for starting the system comprises a starting element connected with said power supply unit and commutating elements connected with said starting element.

5. A system as claimed in claim 4, wherein said unit indicating the commencement and end of the process of boiling, vacuum cooling and dehydration comprises a signalling element, a pneumoelectric transducer of the signal connected to said starting element and indicating the commencement and end of the process of boiling and cooling, a means for adjusting the duration of the control signal controlling said signalling element and connected to said unit for prescribing the program of cooling and a valve for feeding said means for adjusting the duration of the control signal.

6. A system as claimed in claim 3 wherein said unit for controlling the actuating mechanism connecting the chamber with the atmosphere comprises a control circuit operating in the duty with an excessive pressure; a control circuit operating in the duty without an excessive pressure; an "OR" element whose inputs are connected to said control circuits; and a control signal power amplifier connected to said "OR" element.

7. A system as claimed in claim 6, wherein said control circuit operating in the duty without an excessive pressure comprises a memory cell for storing the signal which operates the actuating mechanism connecting the chamber with the atmosphere, said memory cell being connected to a corresponding commutating element of said unit for selection of the operating conditions and for starting the system.

8. A system as claimed in claim 6, wherein said control circuit operating in the duty without an excessive pressure comprises in combination: a memory cell for storing the signal operating the actuating mechanism for communication of the chamber with the atmosphere, said memory cell being connected to a corresponding commutating element of said unit for selection of the operating conditions and for starting the unit, and a means for adjusting the duration of the operating time of the actuating mechanism connected to and erasing the signal in said memory cell.

9. A system as claimed in claim 3 wherein said unit for controlling the steam supply comprises a memory cell for storing the signal operating said unit for controlling the temperature and connected to said starting element; time-delay relay; a pneumoelectric transducer for switching on said time-delay relay connected to said memory cell; an electropneumatic transducer for erasing the signal in said memory cell, said transducer being connected to said memory cell and to said time-delay relay.

10. A system as claimed in claim 9 wherein said unit controlling the actuating mechanism for draining off the condensate comprises in combination: a memory cell for storing the signal controlling the operation of said actuating mechanism connected to said electropneumatic transducer; means for adjusting the operating time of said actuating mechanism and for erasing the memory of the considered control unit and of the control circuit in the duty without an excessive pressure; a control signal power amplifier operating said actuating mechanism, the input of the power amplifier being connected to the output of the memory cell of the considered control unit.

11. A system as claimed in claim 3 wherein said unit for controlling the actuating mechanism for eliminating the vacuum comprises a means for adjusting the operating time of said actuating mechanism after setting the vacuum, said means for adjusting the operating time being connected to said circuit for prescribing the program of vacuum cooling and dehydration, a valve for feeding said means for adjusting the operating time, a signal-power amplifier to operate said actuating mechanism for eliminating the vacuum in the chamber connected to said means for adjusting the operating time.

12. A system as claimed in claim 1 wherein the circuit for prescribing the program of vacuum cooling and dehydration comprises in combination: a unit for preparing the circuit for operation, a timing unit for coding switching signals in a binary code connected to said preparing unit, a decoder of the output signals of the timing unit, a unit of pulse shapers for adjusting the time delay of the signals fed from said decoder, a signal commutator commutating the signals of said pulse shapers, a starting unit connected to said unit of pulse shapers, a unit for prescribing the rate of setting linear sections of the program of vacuum cooling and dehydration connected to said decoder and to said commutator, a unit for prescribing the threshold of the linear sections of the program of vacuum cooling and dehydration connected to said decoder, a unit for presetting the time constant of exponential sections of the program of vacuum cooling and dehydration connected to said decoder, a unit for presetting the asymptote of the exponential sections of the program of vacuum cooling and dehydration connected to said decoder and to the unit for presetting the time constant, and an output unit for switching the circuit components and for power amplification of the output signal connected to said decoder to the units for prescribing the rate of setting the threshold of the linear sections and to the units for presetting the time constant and asymptotes of the exponential sections.

13. A system as claimed in claim 12 wherein the preparing unit comprises valves for passing a ready-down signal and a starting element connected to said valves.

14. A system as claimed in claim 13, wherein the unit for prescribing the rate of setting the linear sections comprises valves for preparing this unit for operation, a cell for prescribing the rate of setting, a constant drop cell for the provision of a continuous supply of said cell for prescribing the rate of setting, and variable capacitors for accurately trimming the rate of setting the linear sections.

15. A system as claimed in claim 13, wherein said unit for prescribing the threshold of the linear sections comprises a cell for setting the values of the thresholds and valves for producing the signal for shaping the linear sections.

16. A system as claimed in claim 13, wherein said unit for presetting the time constant of the exponential sections comprises valves for preparing said unit for operation, inertia cells and valves for producing the signal for shaping the necessary exponential signal.

17. A system as claimed in claim 13, wherein the unit for presetting the asymptotes of the exponential sections comprises cells for setting the values of the asymptotes and valves for shaping the signal.

18. A system as claimed in claim 13, wherein said unit for switching the circuit components and for power amplification of the output signal comprises in combination: a comparison element transferring the program from the shaping of the linear sections to the shaping of the exponential sections, a first accumulator for continuously adding the signals corresponding to the threshold of the linear sections and to their current values, a second accumulator for adding the signals corresponding to the threshold of the linear section and to the asymptote of the exponential section, a comparison element whose input is connected to the second accumulator and whose output is connected to said timing unit, a switch connected to said unit for prescribing the rate of setting the linear sections to the comparison element and to the first accumulator, and a control signal power amplifier connected to said switch, said comparison elements and power amplifier being provided with a feedback circuit.

19. A system as claimed in claim 12 wherein said timing unit comprises memory cells.

20. A system as claimed in claim 12, wherein the commutator comprises "OR" elements.

21. A system as claimed in claim 12, wherein said starting unit comprises a memory cell for storing a triggering pulse and a pulse shaper for erasing the signal in said memory cell.

22. A system as claimed in claim 12 wherein the decoder comprises an inverter for conversion of a single-shot input signal into a zero signal and a zero signal into a single-shot input signal, and values for passing command signals.